United States Patent [19]

Tanaka et al.

[11] Patent Number: 4,852,205
[45] Date of Patent: Aug. 1, 1989

[54] CONTROLLING CIRCUIT FOR WINDOW WIPER ACCOMMODATING APPARATUS

[75] Inventors: Takahiko Tanaka, Shizuoka; Naogi Hisanaga, Kosai; Takeshi Yamamoto; Susumu Okazaki, both of Hiroshima; Shinshi Kajimoto, Kure, all of Japan

[73] Assignee: Mazda Motor Corporation, Hiroshima, Japan

[21] Appl. No.: 164,403

[22] Filed: Mar. 4, 1988

[30] Foreign Application Priority Data

Mar. 5, 1987 [JP] Japan ................................. 62-52256
Mar. 5, 1987 [JP] Japan ................................. 62-52257

[51] Int. Cl.$^4$ ............................................. B60S 1/08
[52] U.S. Cl. ............................... 15/250.17; 296/192; 318/DIG. 2
[58] Field of Search .......... 15/250.16, 250.17, 250.01, 15/250.12; 318/DIG. 2; 296/24 R, 84 R, 84 D, 192, 194

[56] References Cited

U.S. PATENT DOCUMENTS

| | | |
|---|---|---|
| 2,603,813 | 8/1944 | Christensen . |
| 3,121,902 | 2/1964 | Massoll ............................ 15/250.13 |
| 3,688,332 | 9/1972 | Bellware ........................... 15/250.16 |
| 3,694,846 | 10/1972 | Parker .............................. 15/250.16 |
| 4,283,085 | 8/1981 | Sacco et al. ..................... 15/250.16 |

FOREIGN PATENT DOCUMENTS 2852187  6/1980  Fed. Rep. of Germany ... 15/250.17

Primary Examiner—Peter Feldman
Attorney, Agent, or Firm—Burns, Doane, Swecker & Mathis

[57] ABSTRACT

A controlling circuit for a motorcar front window wiper accommodating apparatus of a concealed type wherein a wiper is accommodated within an opening portion provided between the front window lower edge and the bonnet rear-end edge, the opening portion is opened and closed by the cowl cover, to a controlling circuit for interlockingly controlling the operation between the cowl cover and the wiper. It is adapted to operatively cooperate the opening and closing operations of the cowl cover with the wiper, to actuate the wiper when the cowl cover reaches the position where it does not interfere with the lifting wiper wiping portion to be lifted in the position before it reaches its fully open position in the opening process of the cowl cover so as to retain the speediness of the wiper actuation to remove the delay feeling for improving the safety.

9 Claims, 17 Drawing Sheets

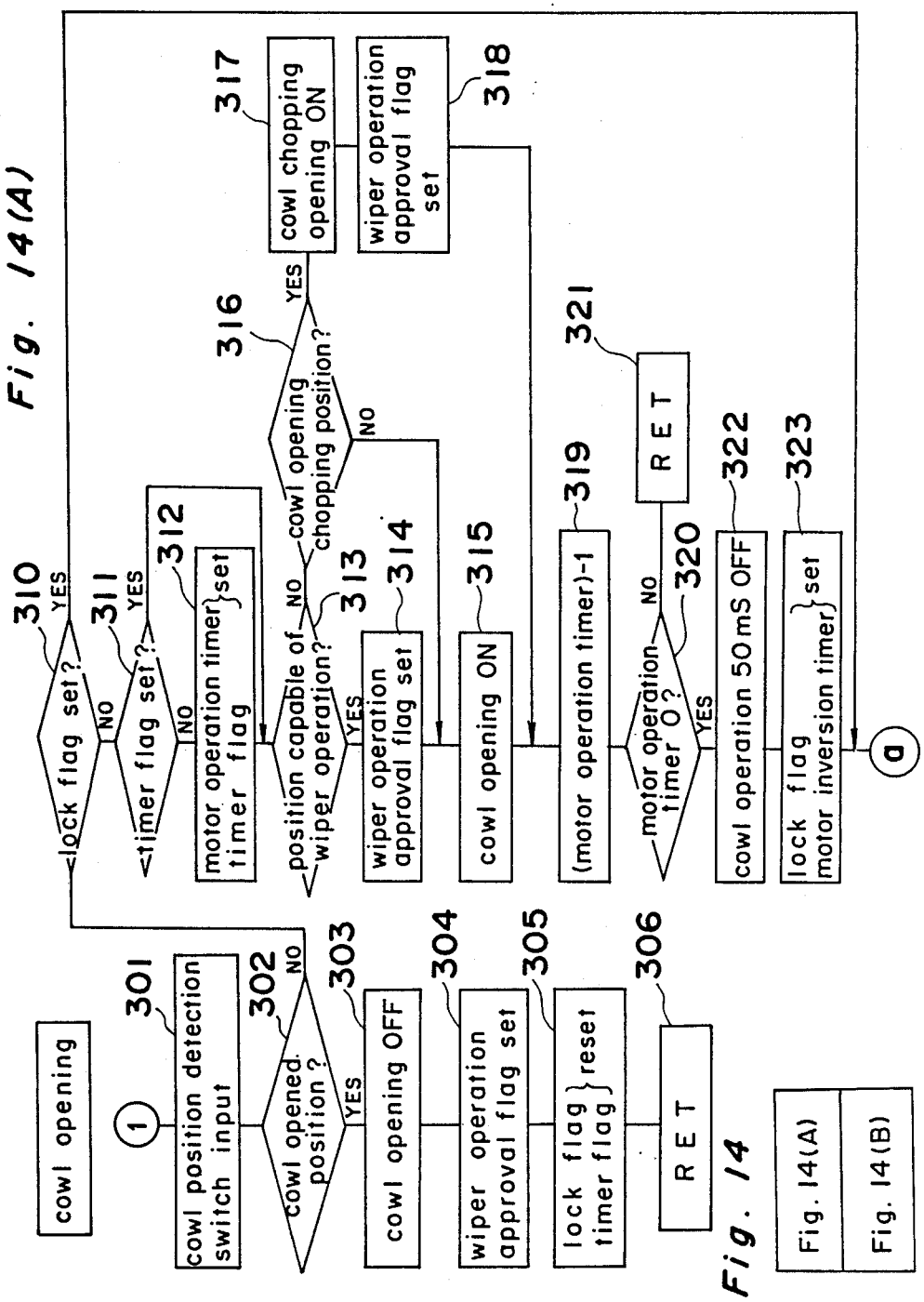

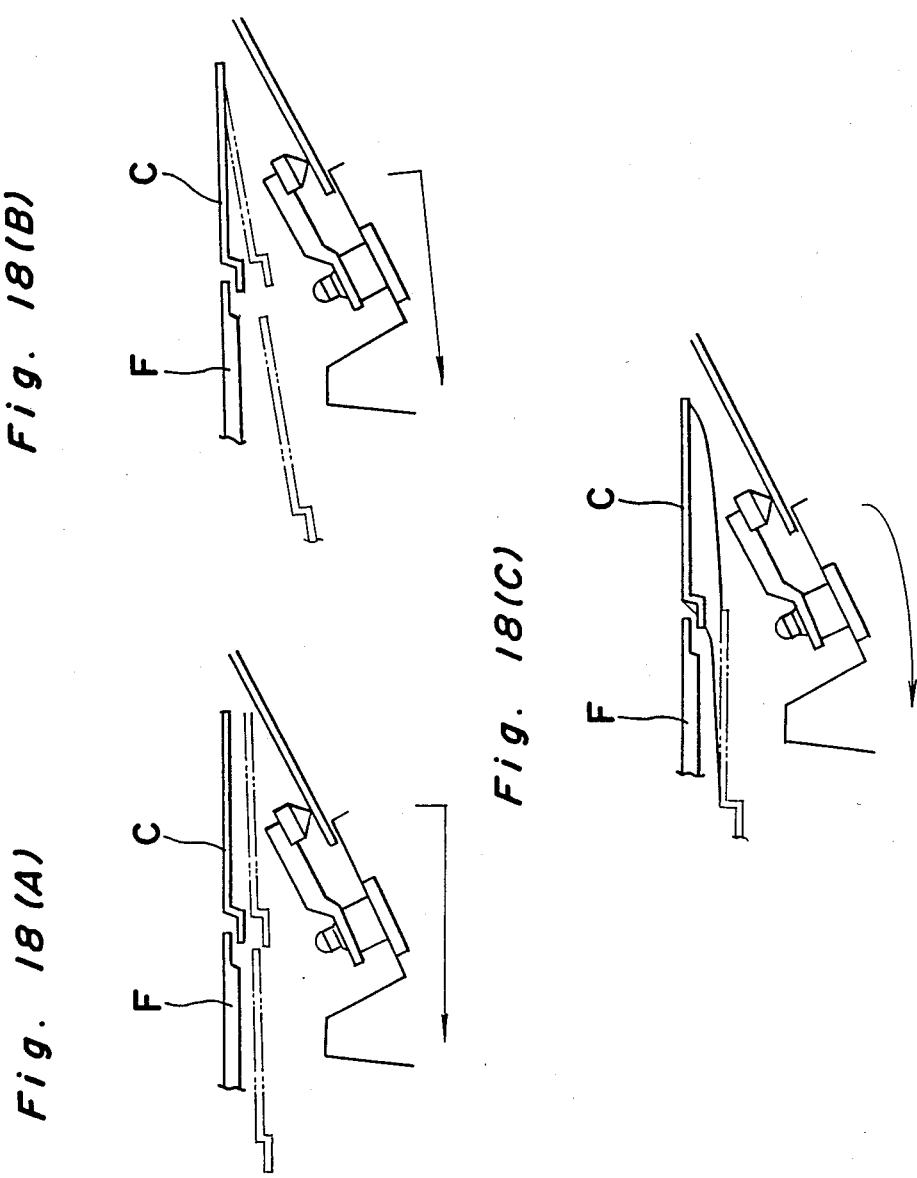

CONTROLLING CIRCUIT FOR WINDOW WIPER ACCOMMODATING APPARATUS

BACKGROUND OF THE INVENTION

The present invention relates to a controlling circuit for a motorcar front window wiper accommodating apparatus and more particularly, in a concealed type wherein a wiper is accommodated within an opening portion provided between the front window lower edge and the bonnet rear-end edge, the opening portion is opened and closed by a cowl cover, to a controlling circuit for interlockingly controlling the operation between the cowl cover and the wiper.

Conventionally, in this concealed type of wiper accommodating apparatus, there are a straight-line moving type shown in FIG. 18(A), a rotary moving type shown in FIG. 18(B), and a nonlinear moving type shown in FIG. 18(C) as cowl-cover moving systems for opening and closing the wiper accommodating portion, with reference character F showing a bonnet and reference character C showing a cowl cover in each drawing. The rotary moving type is adapted to slide after the rotation during the opening operation under simple construction, with the visibility being interfered with during the opening operation, the larger space is required for the movement, and the wider space is not provided in the motorcar width direction. On the other hand, the straightline moving type vertically slides and then longitudinally slides, so that the range of vision is not interfered with and wider space is provided in the vehicle-width direction, with the gap with respect to the glass being larger, the movement not being quick.

As both the rotary moving type and the straightline moving type are of two-stage movement as described hereinabove, the opening and closing speed is slow with the movement not being smooth, thus causing the delayed feeling in the wiper actuation. Also, the moving system requires a link and a cam for changing the direction so as to complicate the construction.

In the conventional wiper accommodating apparatus of a concealed type, the opening and closing operations of the cowl cover are often effected separately from the wiper operation. The cowl cover is once opened fully by the cowl switch and the wiper is actuated by the wiper switch, provided separately. This is because the wiper wiping portion to be lifted had a possibility of interfering with the cowl cover before the cowl cover reaches the fullyopened position, thus causing delay feeling in the wiper actuation. Especially, when the mud is adhered onto the front window by mud splashes during the running operation of the vehicle to deteriorate the range of the visibility, the mud is required to be wiped through the operation of the wiper as soon as possible. However, if the wiper is actuated after the cowl cover has reached to a fully opened position as described hereinabove, the quick wiper operation can not be effected. When it takes a long time to effect the wiper operation because of the slower opening and closing speed of the cowl cover, a problem occurs in terms of safety.

The opening and closing operations of the conventional cowl cover is often adapted to be moved at a constant speed to stop the input by a position signal of a fully opened position or a fully closed position to come to a stop. In this case, the problem is that the inertia of the power source has influences upon the stop position to deteriorate the stop accuracy.

SUMMARY OF THE INVENTION

Accordingly, an essential object of the present invention is to provide a controlling circuit for a window wiper accommodating apparatus, which is adapted to operatively cooperate the opening and closing operations of a cowl cover with the wiper, to actuate the wiper when the cowl cover reaches the position where it does not interfere with the lifting wiper wiping portion in the position before it reaches its fully open position in the opening process of the cowl cover so as to retain the speediness of the wiper actuation to remove the delay feeling for improving the safety.

Another object of the present invention is to provide a controlling circuit for a window wiper accommodating apparatus, which is adapted to change the opening and closing speed of a cowl cover, from the high one to the low one, and to provide a two-stage speed in front of the stopping position to decrease the stop error caused by the inertia in the stopping position.

A further object of the present invention is to provide a controlling circuit for a window wiper accommodating apparatus, which is adapted to adopt a nonlinear moving system (shown in FIG. 18(C)), which is superior in the respective points to the rotary moving type and the straight-line moving type, as the cowl cover moving system, to quickly open and close a cowl cover without being interfered with in the range of the vision by the use of the driving mechanism of the nonlinear moving system.

A still further object of the present invention is to provide a controlling circuit for a window wiper accommodating apparatus, which is adapted to operatively cooperate the opening and closing operations of a cowl cover with the operation of the wiper, to actuate the wiper when the cowl cover reaches the position where it does not interfere with the wiper wiping portion to be lifted in the position before it reaches its fully open position so as to retain the quick driving property of the wiper.

In accomplishing these and other objects, according to one preferred embodiment of the present invention, in a concealed window wiper accommodating apparatus, wherein an opening portion is formed between the lower edge of a front window glass and the rear end portion of a bonnet, the opening portion thereof is opened and closed by a cowl cover, a wiper is accommodated within the opening portion, a controlling circuit is provided operatively in cooperation with a cowl driving motor for operating the cowl cover and a wiper motor for operating the wiper for the drive controlling operation, there provides a controlling circuit for the window wiper accommodating apparatus characterized in that when the wiper switch has been turned on by the controlling operation, the cowl driving motor is driven, the cowl cover which is opened by the cowl driving motor actuates the wiper motor when a position signal for detecting that it has reached the position where the cowl cover does not interfere with a wiper wiping portion to be lifted is inputted, when the cowl cover reaches the position capable of the wiper operation before it reaches the fully open position, the wiper is set to be operated, and a position signal which has detected a position before the fully opened position or the fully closed position is reached is inputted during the opening and closing operations of the cowl cover, and the moving speed of the cowl cover is set to be switched to the low speed from the high speed before the stop position, with a chopping circuit for dropping the voltage to be applied upon the cowl driving motor being provided.

According to the above-described controlling circuit, the opening and closing operations of the cowl cover operatively cooperate with the operation of the wiper, the cowl cover may actuate the wiper when it reaches the position where it does not reach the wiper before it reaches the fully opened position, so that the faster operation of the wiper may be retained than before, the mud may be quickly wiped by the wiper when the mud adhering to the font glass suddenly deteriorates the range of the vision, thus increasing the safety. As a chopping circuit is provided in the controlling circuit, the cowl cover is changed from the high speed to the low speed in front of the stop position to improve the stop accuracy of the cowl cover.

Also, in the wiper accommodating apparatus of a concealed type of the present invention, a nonlinear moving type is adapted as the moving system of the cowl cover, from among three types of moving systems, i.e., the conventionally used linear moving type of vertically sliding and then moving under the bonnet, a rotary moving system of sliding after the rotation, and a nonlinear moving type. A gear portion to be rotatingly driven in synchronous relation by the cowl driving motor is disposed in both the right and left sides to convert the rotating force of the gear portion into the nonlinear movement by the four-section link system to transmit it to the cowl cover, and to nonlinearly slide the cowl cover at one step to effect the opening and closing operations. The adopted nonlinear moving system of the simple and positive operation is superior to the other straight-line moving type or the rotary moving type in the respective points such as continuous face with respect to the bonnet and gap, with respect to the front glass, cowl cover movement, space for requiring the movement, and so on.

Also, according to the present invention, in the opening and closing process of the cowl cover, a switch is provided, which is adapted to open or close the contact point, in accordance with the position of the output shaft, on the gear portion as an apparatus for detecting the position, i.e., at the fully-open position, the position capable of the wiper operation, the chopping starting position, the fully closed position, with the cowl driving motor being feedback-controlled as described hereinabove by the position signal from the detector and operatively cooperates with the wiper motor. As such a cowl position detector is used, the operating position of the cowl cover may be detected easily and correctly, and it may be set without taking the space.

In the present invention, a cowl switch which operatively cooperates with a wiper switch is provided, so that the opening and closing operation of the cowl cover only, the AUTO operation for operatively cooperating the cowl cover and the wiper may be selected by the on and off operation of the cowl switch. Accordingly, the upkeep, inspection and cleaning of the wiper may be readily effected with the cowl cover only being open.

Also, there provides a concealed windshield wiper accommodating apparatus wherein an opening portion is formed between the lower edge of the front window glass and the rear end portion of the bonnet, the opening portion is opened and closed by a cowl cover, a wiper is accommodated within the opening portion, the windshield wiper accommodating apparatus characterizing in that a gear portion is disposed on both the right and left sides of the opening portion, which is rotatably driven in the synchronous relation by a cowl driving motor provided in the opening portion or within the bonnet, one end of one section within the four-section link system is secured to the output shaft of each gear portion, one end of the output section which performs a nonlinear movement is coupled to the cowl cover so that the cowl cover is adapted to move nonlinearly under the bonnet while retaining the inclination of the bonnet extension, a guide member which has a long groove the same as the nonlinear shape of the movement track of the cowl cover is provided by one or more at least within the opening portion, a roller which is engaged for its free slidable rotation within the long groove is provided on the cowl cover, the cowl cover is guided through the long groove so that it is adapted to be nonlinearly moved under the bonnet, and a cowl position detector which is provided with a contact point to be opened or closed in accordance with the position of the output shaft is provided on at least one gear portion so that the cowl position detector is adapted to actuate a wiper motor when it detects that it has reached the position capable of the wiper operation before reaching the fully opened position during the opening operation of the cowl cover. As described hereinabove, a nonlinear moving system for nonlinearly sliding at one stage is adapted as a moving system of a cowl cover, the connection between the avoiding movement with respect to the bonnet and the sliding operation into the lower side of the bonnet becomes smoother and the range of the vision is not interfered with during the opening operation. In the nonlinear moving system, no stage difference is provided between the bonnet and the cowl cover during the closing operation, with the continuous face being good, the gap may be made very small window glass, thus being better as compared with the above-described other moving system. As described hereinabove, in the present invention, the opening and closing operations of the cowl cover are operatively cooperative with the wiper driving to actuate the wiper when it reaches the position where it does not interfere with the wiper before it reaches the fully opened position, faster operation of the wiper may be retained than before, and the mud may be quickly wiped by the wiper when the mud adhering to the front window glass deteriorates the range of the visibility so as to improve the safety.

Also, in the present invention, a spring is tensed between the cowl cover and the output section so that the couple forces may be applied upon the output sections of the four-section link system, so that the play may be removed at the opening and closing operations of the cowl cover and in the opening position.

In the present apparatus, during the opening of the cowl cover, a stopper which comes into contact against the engagement portion of the side of the cowl cover is provided on the output section of the four-section link system to retain the inclination of the cowl cover during the opening to determine the stable position of the cowl cover.

In the present apparatus, the cowl cover driving motor is disposed at the central portion of the motorcar body to respectively connect the torque cables with both ends of the output portion of the cowl driving motor so that the rotary torque is adapted to be transmitted in synchronous relation to the gear portions disposed on both the right and left sides of the opening portion through these torque wire cables, thus improving the free degree of the cowl driving motor disposed, with the synchronous means being the most inexpensive in the two-point output to slide the long cowl cover.

BRIEF DESCRIPTION OF THE DRAWINGS

These and other objects and features of the present invention will become clear from the following description taken in conjunction with the preferred embodiments thereof with reference to the accompanying drawings, in which:

FIGS. 18(A), 18(B) and 18(C) are schematic views each showing the moving systems of the cowl cover.

DETAILED DESCRIPTION OF THE INVENTION

Figure 1:
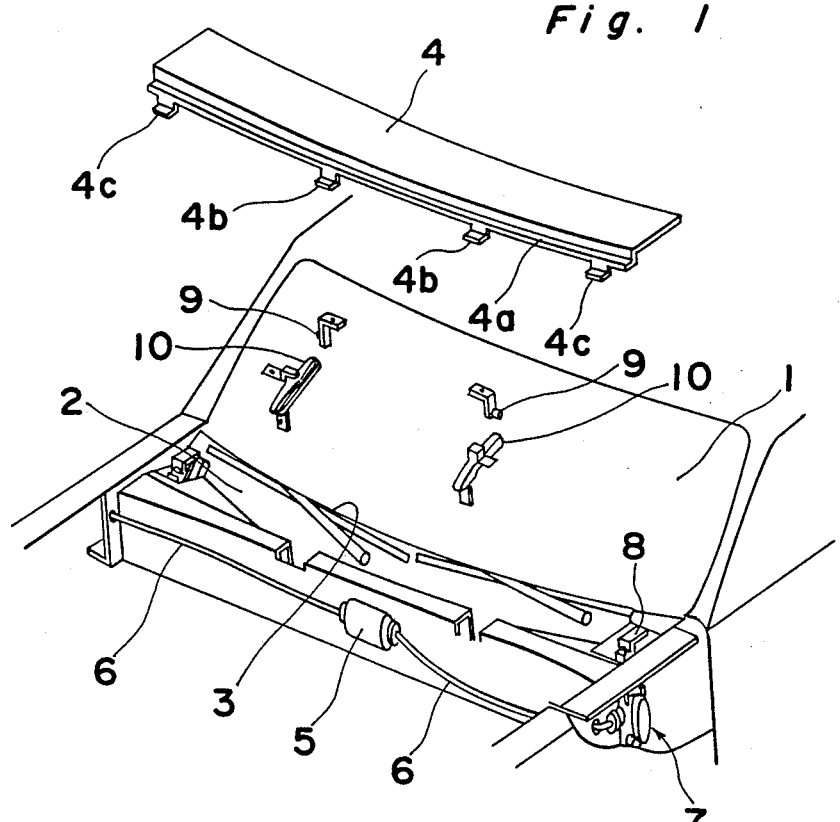
FIG. 1 is an exploded perspective view of a wiper accommodating apparatus showing the embodiment of the present invention.

Before the description of the present invention proceeds, it is to be noted that like parts are designated by like reference numerals throughout the accompanying drawings.

Figure 2:
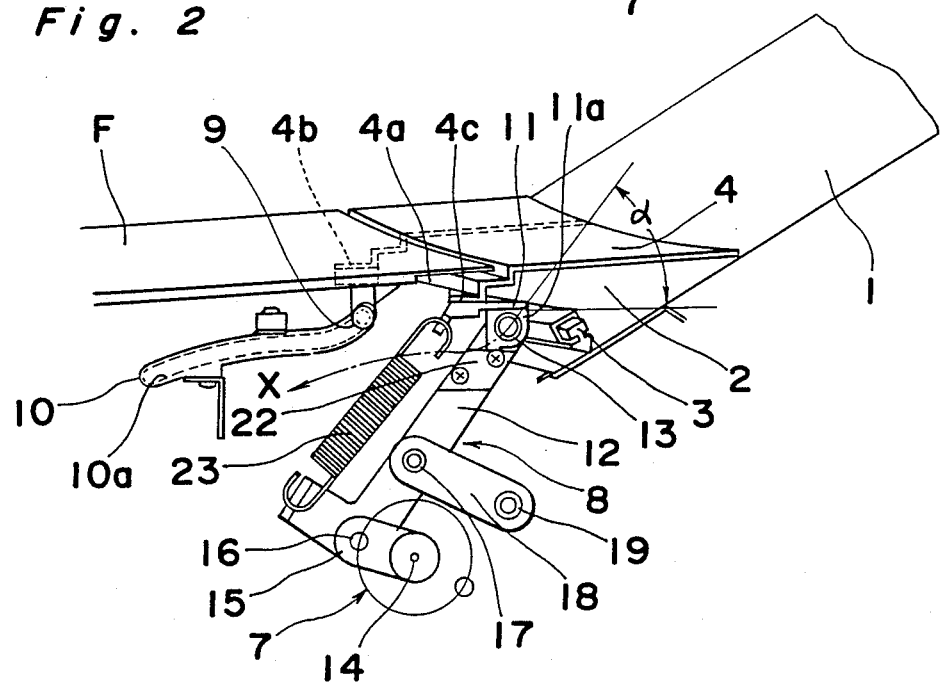
FIG. 2 is a perspective view showing the closed condition of a cowl cover.
Figure 3:
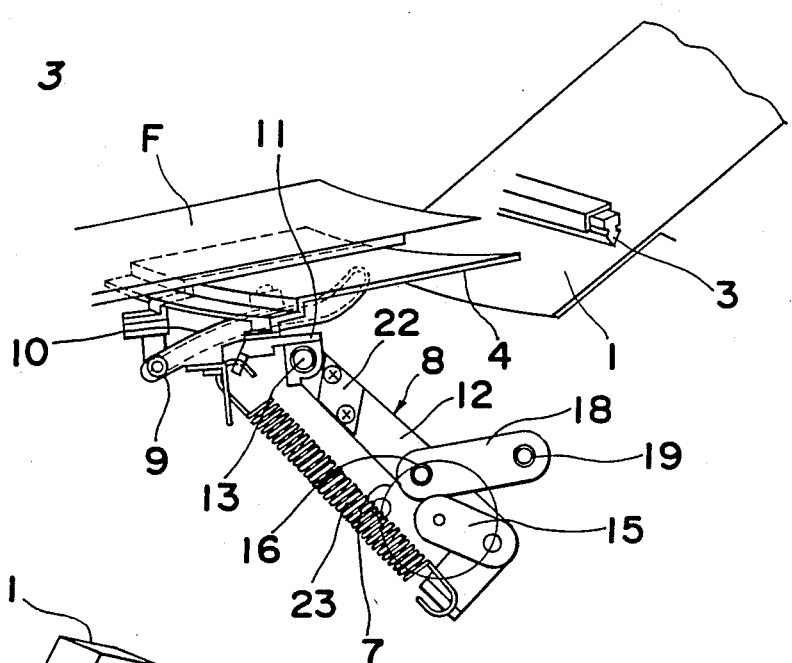
FIG. 3 is a perspective view showing the opened condition of the cowl cover.

Returning now to the drawings, there is shown in FIGS. 1 through 3, a window wiper accommodating apparatus of a concealed type according to one preferred embodiment of the present invention, wherein an opening portion 2 is formed across the direction of the motorcar width between the lower edge of the front window glass for the motorcar and the trailing edge of a bonnet F, the opening portion 2 is opened or closed by a cowl cover 4, a wiper 3 is accommodated within the opening portion 2, the cowl cover 4 is operated to open at the wiper operation to open the opening portion 2, so that the wiping portion of the wiper 3 is lifted to effect the wiping operation.

As shown in FIG. 1, the opening portion 2 has therein a DC motor 5 for driving the cowl which has two brushes at the central portion in the width direction of the vehicle. The motor 5 for driving the cowl is connected at its both ends with each one end of the torque wire cables 6 and 6 which may be freely transformed, with the other ends of the torque wire cables 6, 6 being connected with gears 7 and 7 disposed at both ends of the vehicle to transmit the rotating force of the cowl driving motor 5 to the gears 7, 7. The rotating force of the cowl driving motor 5 is converted into nonlinear movements by link systems 8, 8, to be described later, after it has been decelerated by the gears 7, 7, and is transmitted to the cowl cover 4. When the rotating torque is transmitted to the right and left gears 7, 7 through the torque wire cables 6, 6 from both ends of the output portion of the cowl driving motor 5, the force synchronized with the right and left gears may be transmitted. When the two-point outputting operation is performed to slide the cowl cover 4 of longer width, it may become the most inexpensive synchronizing means, thus resulting in the higher degree of freedom in the arrangement of the cowl driving motor 5.

The cowl cover 4 is plate-shaped to cover the opening portion 2. It is provided with a bonnet engagement portion 4a which is bent downwardly in L-shape along its leading edge, with brackets 4b, 4b mounted with guide rollers 9, 9 being provided on both sides on the central portion of the bonnet engagement portion 4a. The guide rollers 9, 9 are slidable engaged into the long grooves 10a, 10a of the nonlinearly-shaped guide members 10, 10 shown disposed within the opening portion 2.

Figure 4:
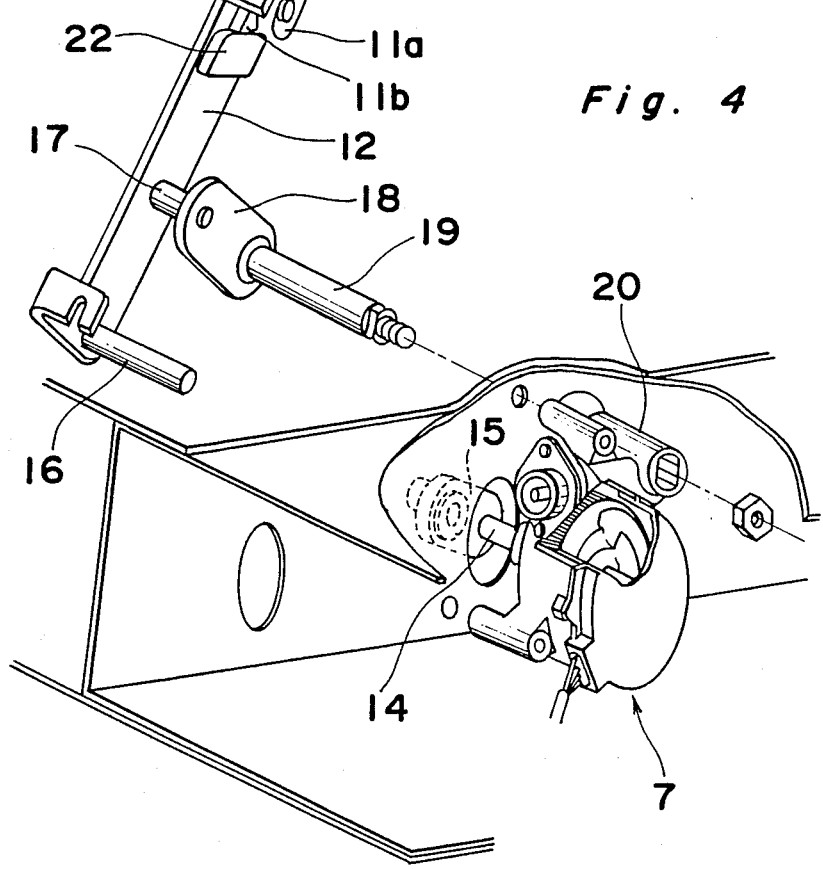
FIG. 4 is an exploded perspective view of a cowl cover driving portion.

Also, both end sides of the bonnet engagement portion 4a have brackets 4c and 4c projected therefrom, which are adapted to couple the link systems 8 and 8. As shown in FIGS. 2 through 4, the under faces of the respective brackets 4c and 4c are respectively secured onto one end side of the lever 11, with the top end of a first lever 12 being rotatably pivoted through a shaft 13 on a bearing portion 11a formed on the side of the other end of the lever 11. One end of a second lever 15 is secured onto the output shaft 14 of the gear portion 7, while the other end of the second lever 15 is rotatably coupled through the shaft 16 to the lower end of the first lever 12. One end of a third lever 18 is rotatably coupled through a shaft 17 to an intermediate position of the first lever 12, while the other end of the third lever 18 is rotatably coupled to a shaft 19 so that the shaft 19 is fixedly retained by the bearing 20 disposed in the casing of the gear portion. The first lever 12, the second lever 15, and the third lever 18 form a so-called four-section link, with the output shaft 14 and the shaft 19 of the gear portion 7 as a stationary pivot, to effect a lever crank operation. The second lever 15 rotates in accordance with the rotation of the output shaft 14 to rotate the first lever 12 which becomes an output section, and to rotate the third lever 18 with the shaft 19 as a support point, so that the pivotal shaft 13 at the top end of the first lever 12 is set to effect a nonlinear movement shown with an arrow X of one-dot chain line in FIG. 2. The guide groove 10a of the guide member 10 is formed in the nonlinear shape which is the same in shape as the movement track of the output section of the four-section link. The driving introduction of the cowl cover 4 is effected by the use of the guide groove 10a at the opening operation of the cowl cover 4 to smooth out the connection between the evasive movement with respect to the bonnet F and the sliding movement into the bonnet lower-portion so as to be accommodated under the bonnet F while the inclination of the bonnet extension is being retained.

As the cowl cover 4 may rotate with the roller 9 as a center when the first lever 12 overruns at the closing operation of the cowl cover 4, a stopper 22 is mounted on the upper portion of the lever 12, so that the engagement portion 11b disposed on the lever 11 is adapted to be engaged with the stopper 22 in a closing position shown in FIG. 2. The engagement with the stopper 22 makes it impossible to allow the lever 11 to turn to the left, with the lever being able to turn to the right only, in FIG. 2, with respect to the shaft 13, to stabilize the lever 11 with the inclination of an angle α to the first lever 12, so that the cowl cover 4 in the closed position is in position retained with a predetermined inclination. In order to prevent the play at the operation of the cowl cover 4 and at the opening stop position, a spring 23 between the lever 11 and the lower end of the first lever 12 is pulled so that the couple of the cowl cover 4 may be applied upon the output section of the four-section link by the spring 23 to absorb the play at the operation time of the cowl cover 4 and the opening stop time.

The cowl cover 4 is set at its opening time so that the top face of a plate portion forms a plate which is not different in stage from the top face of the bonnet F, and the gap between the front end of the cowl cover 4 and the rear end of the bonnet F may be delicate as shown in FIG. 2.

The opening and closing operations of the cowl cover 4 by the driving apparatus will be described hereinafter. When the wiper switch or the cowl switch (which is not shown in FIGS. 1 through 3) within the compartment is turned on, the cowl driving motor 5 is rotatably driven from the closing position of FIG. 2 to the opening position shown in FIG. 3 to transmit the rotating torque to the gears 7 and 7 by the torque wire cables 6 and 6 for driving the deceleration rotation of the output shaft 14 for the gears 7 and 7. The first lever 12 is rotated counterclockwise in FIG. 2 by the rotation of the output shaft 14 to move the coupled second lever 15 and also to rotate the third lever 18 coupled to the first lever 12. Namely, by the four-section link system, the rotation of the output shaft 14 of the gear 7 nonlinearly moves the cowl cover 4 coupled through the shaft 13 and the lever 11 to the top end through the movement of the second lever 15. The cowl cover 4 is nonlinearly moved by the four-section link system, and the roller 9 is guided by the guide members 10 and 10, so that it is nonlinearly moved to the lower portion of the bonnet F, as shown with an arrow X of one-dot chain line in FIG. 2, to open the opening portion. As the lever 11 and the first lever 12 are rotatably coupled by the shaft 13 at the movement of the cowl cover 4, the play is caused in the cowl cover 4, but a spring 23 allows the cowl cover 4 to operate without any play and to stop even at the fully open position without play.

The movement is performed reversely with respect to the above-described movement from the opening position shown in FIG. 3 to close the closing position of FIG. 2. At this time, as the stopper 22 of the first lever 12 is in contact against the engagement portion 11b of the lever 11 in the fully closed position, the inclination of the cowl cover 4 may be stabilized in the fully closed position.

Figure 5:
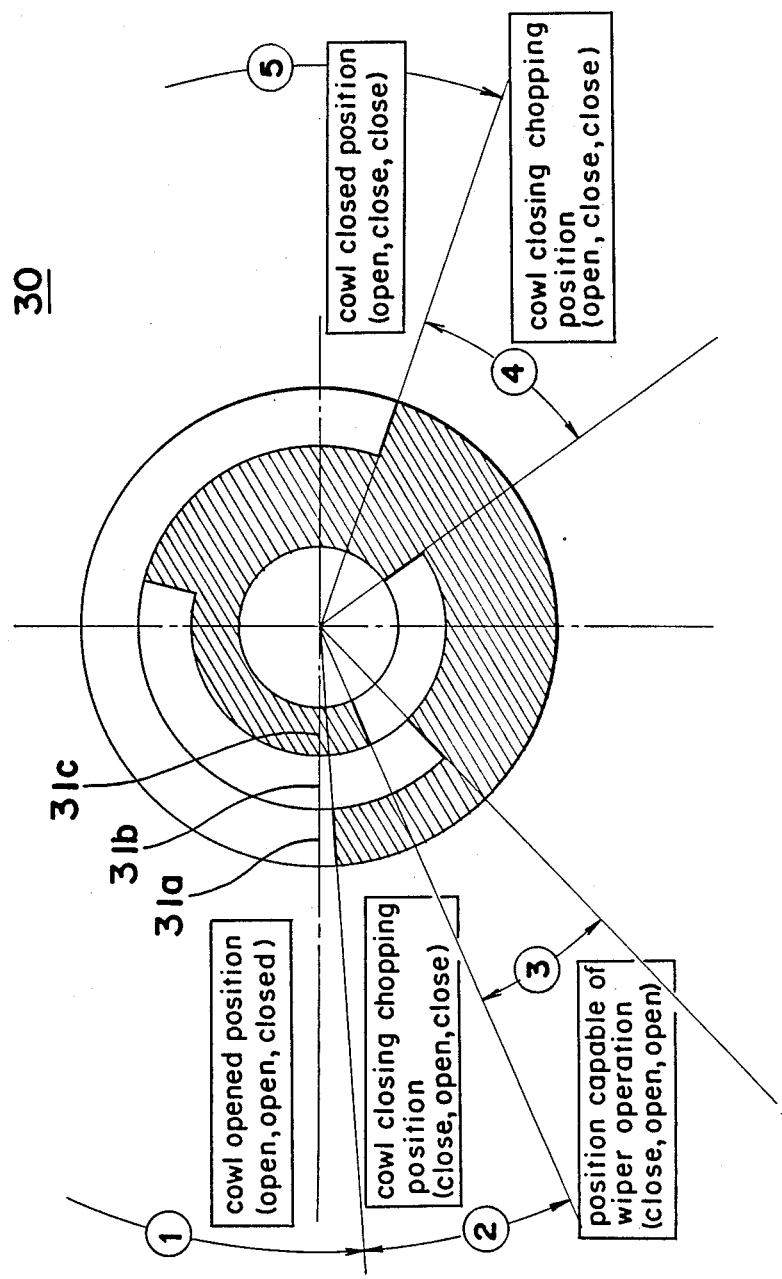
FIG. 5 is a view for illustrating a cowl position detector.

In the present wiper accommodating apparatus, the moving speed is controlled during the opening and closing operations of the cowl cover 4 to operate through the operative cooperation with the wiper 3. Accordingly, the gear 7 has such a cowl position detector 30 therein as shown in FIG. 5 to output the gear rotation position signal from the cowl position detector to a control circuit 33 shown in FIG. 6 and FIG. 7. The operation speed is controlled in accordance with the operation position of the cowl cover 4 through the feedback control of the cowl driving motor 5 and the operative cooperation with the wiper motor 38 and the washer motor is controlled in accordance with the operation position of the cowl cover 4. Namely, although the description is given later in accordance with the drawings, both at the opening of the cowl cover 4 and the closing operation thereof, the high-speed operation is effected till the position (chopping start position) prior to the entrance into the stop position is detected by the position signal of the cowl position detector 30. When the chopping start position is detected for outputting into the control circuit 33, the inputting into the cowl driving motor 5 is chopped by the controlling circuit 33 to operate the cowl cover 4 at the low speed and also to effect the inertia operation immediately before the stop position. The chopping operation is effected at the position prior to the stop like this to reduce the stop error which is caused by the inertia to improve the stop precision. In a position before the cowl cover 4 enters the opening completion position (fully open position) at the opening operation of the cowl cover 4, the cowl cover 4 reaches a position (position capable of the wiper operation) where the cowl cover 4 does not interfere with the wiping portion of the wiper 3 to be lifted. When the position capable of the wiper operation is detected, the detection signal is outputted to the control circuit 33 to allow the wiper motor 38 to be actuated. The wiper 3 and the washer are actuated, before the cowl cover 4 reaches the fully open position, to ensure the quick operation of the wiper.

The cowl position detector 30 and the control circuit 33 will be fully described hereinafter.

The cowl position detector 30 is a position detection switch to be opened or closed in accordance with the output shaft 14 of the gear 7, having three contact points 31a, 31b, 31c. These contacts 31a, 31b, 31c are respectively set to (open, open, close) when the rotating position of the output shaft 14 has reached the cowl cover fully open position shown by (1) in FIG. 5, to (close, open, close) when the rotating position has reached the cowl cover opening chopping position shown by (2), to (close, open, open) when the rotating position has reached the position capable of the wiper operation shown by (3), to (close, close, close) when the rotating position has reached the cowl cover closing chopping position shown by (4), and to (open, close, close) when the rotating position has reached the fully closed position shown by (5).

Figure 6:
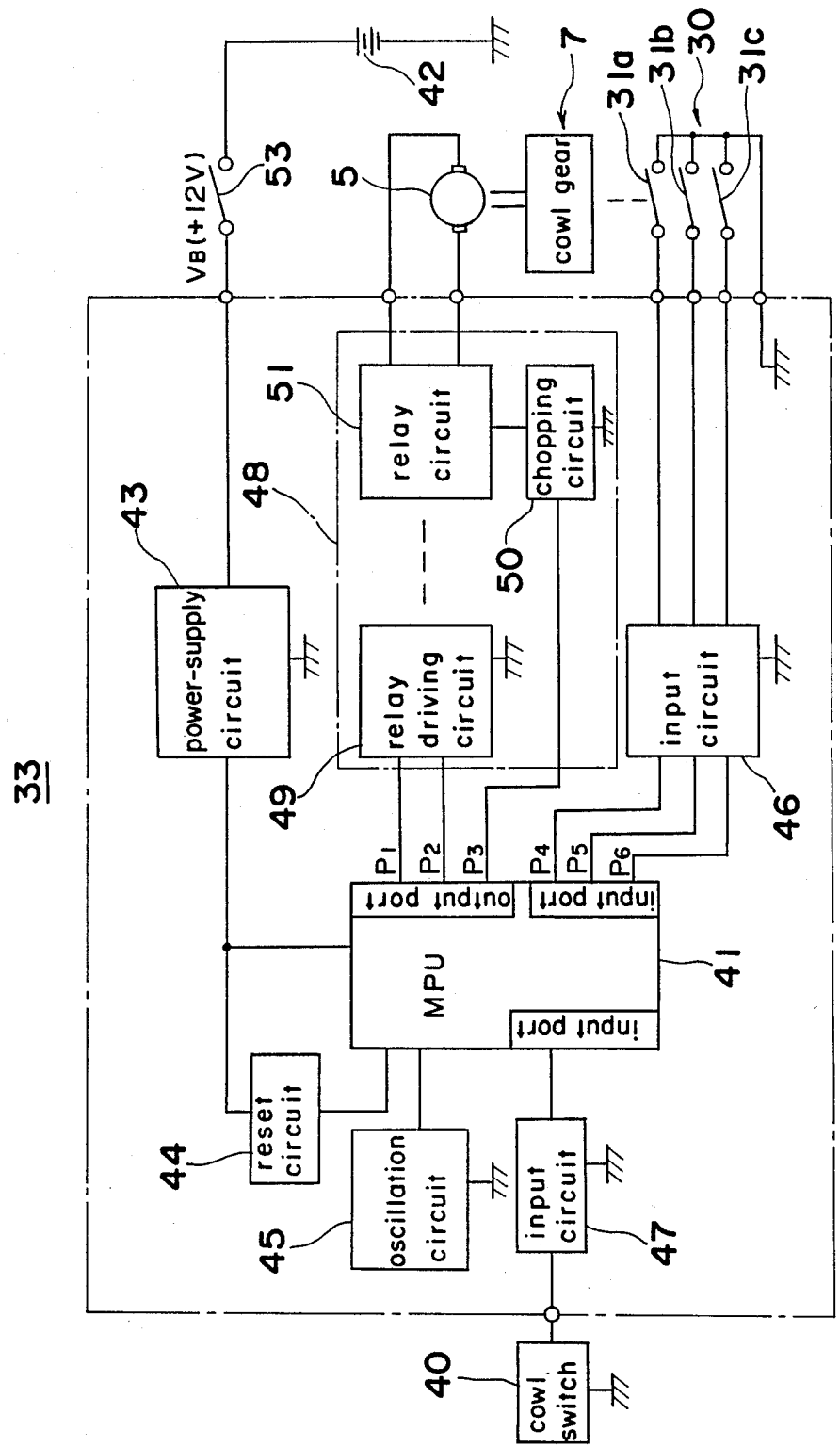
FIG. 6 is a block diagram of a controlling circuit.

The cowl position detector 30 is capable of outputting the position of the output shaft 14 as a position signal of three bits, but also of outputting the cowl switch signal of one bit by the opening and closing of the cowl switch 40 shown in FIG. 6. The cowl switch 40 is a selection switch for selecting and indicating an AUTO operation which operatively cooperates the opening operation of the cowl cover 4 with the wiper driving operation, and an opening operation of the cowl cover 4 only. The selection has one contact point provided as shown. When the contact point is closed with the switch being on, only the cowl switch signal of one bit is outputted into the control circuit 33 to cause the opening operation of the cowl cover 4 only to be effected.

As shown in the block diagram of FIG. 6, the control circuit 33 includes a microcomputer 41 (hereinafter referred to as MPU), a power supply circuit 43 for feeding the voltage from the power supply 42 for vehicle use to the MPU 41, a resetting circuit 44 for causing resetting signals in the MPU 41 included in the power supply circuit 43, an oscillating circuit 45 for causing clock signals into the MPU 41, an inputting circuit 46 for inputting signals from the respective switches 31a, 31b, 31c of the cowl position detector 30 into the input ports P4 through P6 of the MPU 41, an inputting circuit 47 for inputting signals from the cowl switch 40 into the input portion of the MPU 41, and a motor driving circuit 48 for cowl driving use which drivingly controls the motor 5 for cowl driving use by the output signal of the MPU 41. The motor driving circuit 48 for cowl driving use has a relay driving circuit 49 connected with the output ports P1, P2 of the MPU 41, a chopping circuit 50 connected with the output port P3 of the MPU 41, and relay circuit 51 connected with the relay driving circuit 49 and the chopping circuit 50, connected with both the brushes of the motor 5 for cowl driving use.

Figure 7A:
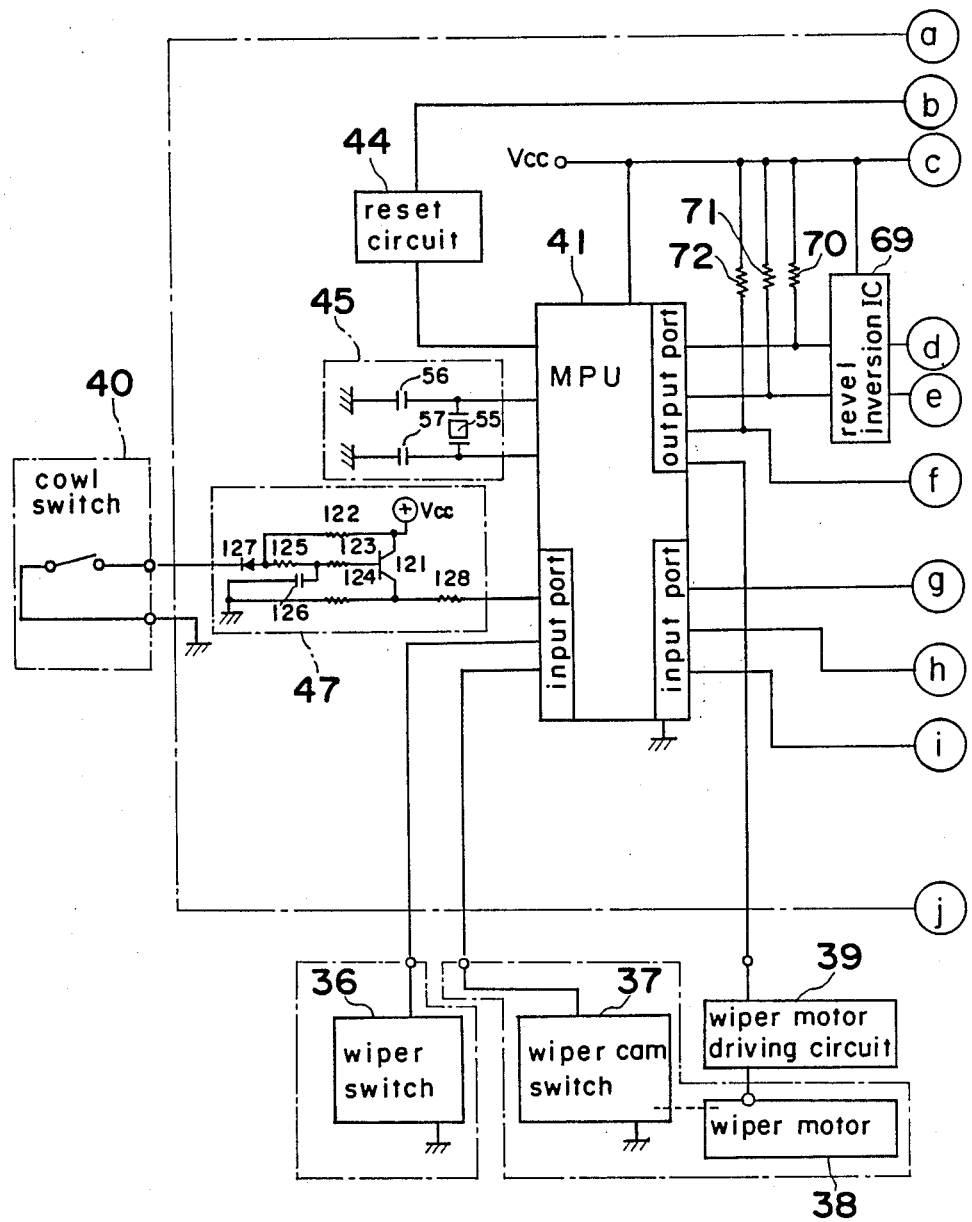
FIG. 7 is a circuit diagram of the controlling circuit.
Figure 7B:
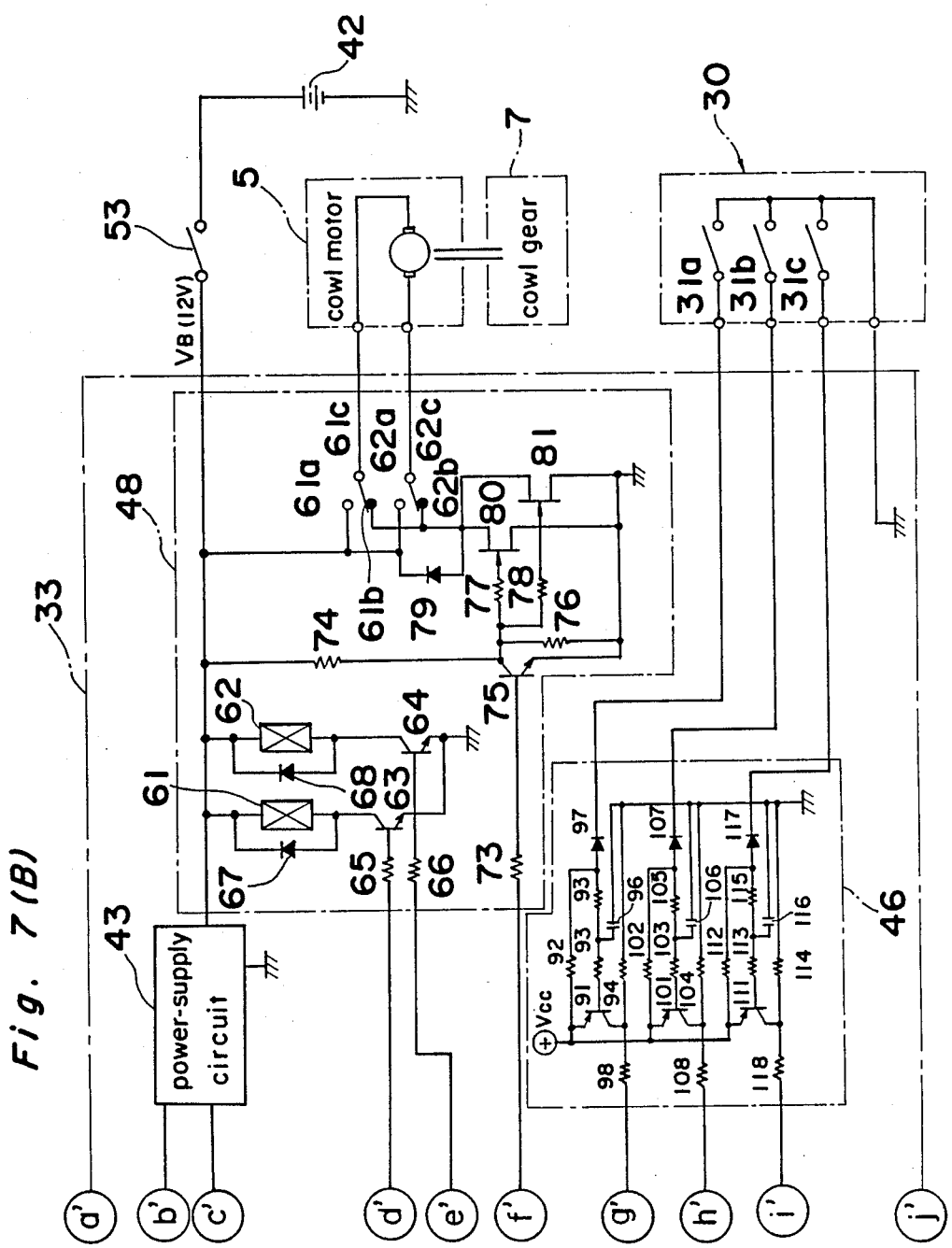

The MPU 41 and each circuit are constructed as shown in FIG. 7. The MPU 41 is a well known controlling computer having a read-only memory (ROM), a memory capable of reading and writing (RAM), output ports P1 through P3, input ports P4 through P7, etc. The MPU 41 effects the progression calculation, comparison, decision, etc. in accordance with the predetermined program to control a motor driving circuit for cowl driving use. The voltage VB (12V) for vehicle use is fed, by way of a key switch 53 from a battery 42 which becomes the power supply for vehicle use, to the motor driving circuit 48 for cowl driving use. Also, the voltage VB (12V) for vehicle use is converted into a voltage VCC (5V) for logical circuit use from the power supply circuit 43 to feed the voltage to the MPU 41.

An oscillation circuit 45 connected with the MPU 41 is composed of a crystal vibrator 55 performing the oscillations by the frequency of several MHz and capacitors 56, 57 for oscillator stabilization use and generates basic clock signals in the MPU 41 or generates resetting signals of low level (L) when the power supply is put to work from the key switch 53 through the connection, to the MPU 41, of the resetting circuit 44 included within the power supply circuit 43.

The motor driving circuit 48 for cowl driving use is provided with a relay 61 for driving the opening operation, a relay 62 for driving the closing operation, and electrostatic transistors 80, 81 for voltage control use which constitute the chopping circuit 50. The relays 61, 62 are respectively connected at the one end of each coil with the power supply VB (12V) for vehicle use at the other end thereof with the collector of the transistors 63, 64, and are respectively connected in parallel with diodes 67, 68 for surge absorbing use. The emitters of the transistors 63, 64 are earthed, with the base being connected with the output ports P1, P2 of the MPU 41 by way of resistors 65, 66 and a level inversion IC 69. Also, pull-up resistors 70, 71 are connected between the level inversion IC 69 and output ports P1, P2.

The contact-point normal close-side terminals 61b, 62b of the relay 61 for the open-operation driving use and the relay 62 for the close-operation driving use are both connected onto the drain side of the electrostatic transistors 80, 81 for voltage controlling use, and the normal open-side terminals 61a, 62a of the relays 61, 62 are both connected with the power supply XB (12V) for vehicle use. Also, the common terminals of both the relays 61, 62 are connected with both of the brushes of the motor 5 for cowl driving use. In order to absorb the surge voltage to be caused at the on and off operation of the motor 5 for the cowl driving use, a diode 79 is connected between the normal open-side terminals 61a, 62a of both the relays 61, 62 and the drain side of the electrostatic transistors 80, 81 for voltage controlling use. The source side of the electrostatic transistors 80, 81 for voltage controlling use is earthed, with the gate side being connected on the side of the collector of the output-level inversion transistor 75 through linking prevention resistors 77, 78. The collector side of the inversion transistor 75 is connected with the power supply for vehicle use through the resistor 74 to divide the voltage VB, and controls the collector current through the resistor 76. Also, the base side of the inversion transistor 75 is connected with the output port P3 of the MPU 41 through the resistor 73 to have the pull-up resistor 72 connected in parallel between the resistor 73 and the output port P3.

In the input circuit 46, the respective one-ends of three switch contacts 31a, 31b, 31c of the cowl position detector 30 are respectively connected onto the side of the base of the transistors 91, 101, 111 by way of a chattering absorbing circuit composed of + surge protective diodes 97, 107, 117, resistors 93, 95, 103, 105, 113, 115 and capacitors 96, 106, 116. Resistors 92, 102, 112 are connected among the diodes 97, 107, 117 and the power supply to flow several mA current for contact-point oxidation prevention use during the closure of the contact points 31a, 31b, 31. Collector current limiting resistors 94, 104, 114 are connected onto the side of the collector of the transistors 91, 101, 111 and are connected to the input ports P4, P5, P6 of the MPU 41 by way of the protective resistors 98, 108, 118. The other ends of the switch contact-points 31a, 31b, 31c of the cowl position detector 30 are earthed.

In accordance with the opening and closing of the contact points 31a, 31b, 31c, i.e., the position of the gear output shaft 14 by way of the input circuit 46, the position signals of the (L, L, H) level are inputted in the cowl full-opening position (1) shown in FIG. 5, the position signals of the (H, L, H) level are inputted in the cowl opening chopping position (2), the position signals of the (H, L, L) level are inputted in the position (3) capable of the wiper operation, the position signals of the (H, H, H) level are inputted in the cowl closing chopping (4), and the position signals of the (L, H, H) level are inputted in the cowl full-closing position (5), respectively, to the input ports P4, P5, P6 of the MPU 41.

In the cowl switch 40, one end of the contact point is earthed, the other end thereof is connected onto the side of the base of the transistor 121 by way of the chattering absorption circuit composed of a + surge protective diode 127 of the input circuit 47, resistors 123, 125 and a capacitor 126. A resistor 122 is connected with the protective diode to flow several mA current for contact-point oxidation preventing use during the closure of the cowl switch 40. The collector current limiting resistor 124 is limited on the side of the collector of the transistor 121. It is connected with the input port P7 of the MPU 41 by way of the protective resistor 128.

Figure 8:
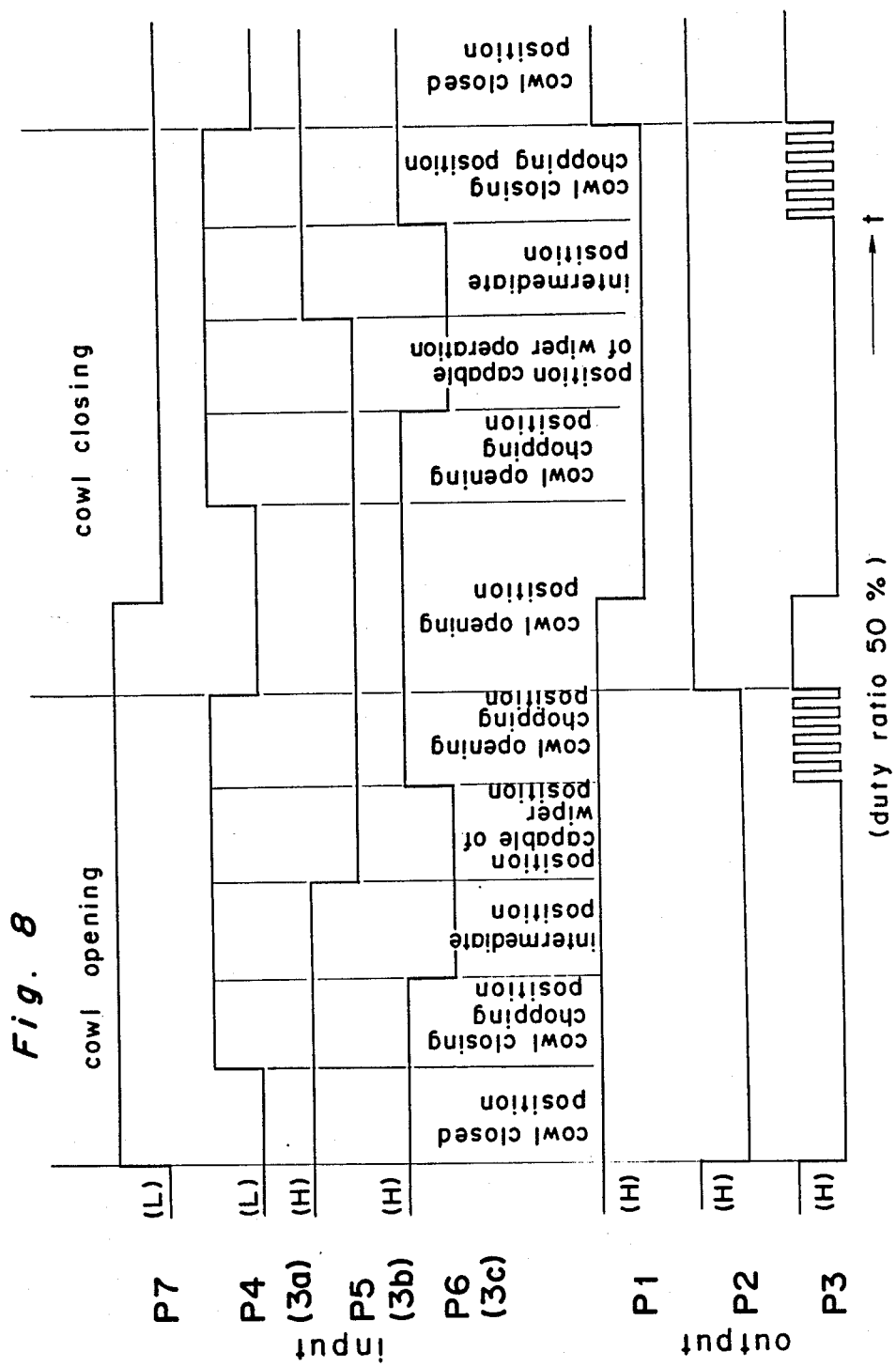
FIG. 8 is a diagram showing the level signals of the respective input portions and output ports of the MPU of the controlling circuit.

The (H) or (L) level signal as shown in FIG. 8 is inputted to the respective input ports P4 through P7 of the MPU 41 at the cowl opening operation and closing operation. The position signal of the (H) or (L) level shown is transmitted from the output ports P1 through P3 in accordance with the input signal.

A cowl switch 40, a wiper switch 36, and a wiper cam switch 37 are connected with the input port P7 of the MPU 41. The operation becomes an automatic one when the cowl switch 40 turns off to operatively cooperate with the wiper switch 36. When the cowl switch turns on, the cowl cover 4 remains open independently of the wiper switch 36.

Figure 9:
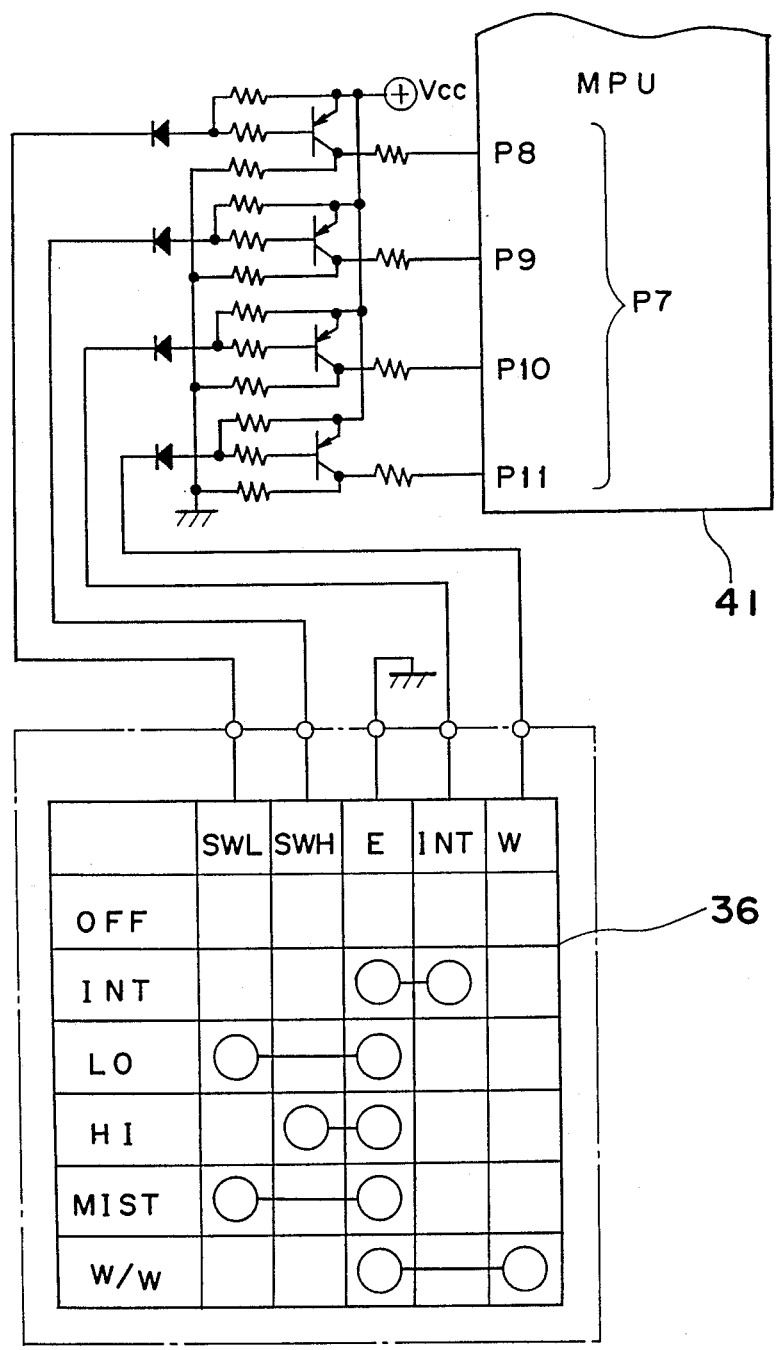
FIG. 9 is a circuit diagram showing the connecting condition between the wiper switches and the MPU.

As shown in FIG. 9, the wiper switch 36 includes an INT switch (intermit switch), a LO switch, a HI switch, a MIST (mist switch) and W/W switch (washer switch) as shown in FIG. 9, with one terminal (INT, SWL, SWH, W) of the respective switches being as shown to the port P7 (port P8, P9, P10, P11) of the MPU 41, with the other end being earthed. In order to operate the wiper motor 38 in accordance with the input signal from the wiper switch 36, the wiper motor 38 is connected with the output port of the MPU 41 through the wiper motor driving circuit 39 as shown. Although not shown, the washer motor is also operatively cooperated with the output port.

When the INT switch of the wiper switch 36 is turned on, the motor for driving the cowl 5 is operated. When the wiper operation possible position is detected by the cowl position detector 30, the wiper motor 38 is operated. Thereafter, while the INT is on, the wiper is caused to perform its normal intermittent operation with the cowl cover 4 being open.

The LO switch is turned on to open the cowl cover 4 as the INT does to cause the wiper motor 38 to effect the LO operation.

The HI switch causes the wiper motor 38 to effect the HI operation as the LO does.

The MIST switch is turned on to output a constant short time of pulse to the port P8 to turn on the cowl driving motor 5 to open the cowl cover 4 so as to detect the wiper operation possible position, so that the wiper motor 38 is caused to effect its wiping operation one time to close the cowl cover 4 after the wiper has been stopped and accommodated.

When the W/W switch is turned on for a constant time (about one second), the pulse enters the port P11 to turn on the cowl driving motor 5 to detect the wiper operation possible position, so that the washer motor is operated to operate the wiper motor 38 less than about 0.5 seconds after the operation of the washer motor. After the wiping operation has been operated about three times, the wiper stops in the accommodated position to close the cowl cover 4.

The wiper operation will be described hereinafter which operatively cooperates with the opening and closing operations of the cowl cover 4 through the control circuit and the operation of the cowl cover 4.

Figure 10:
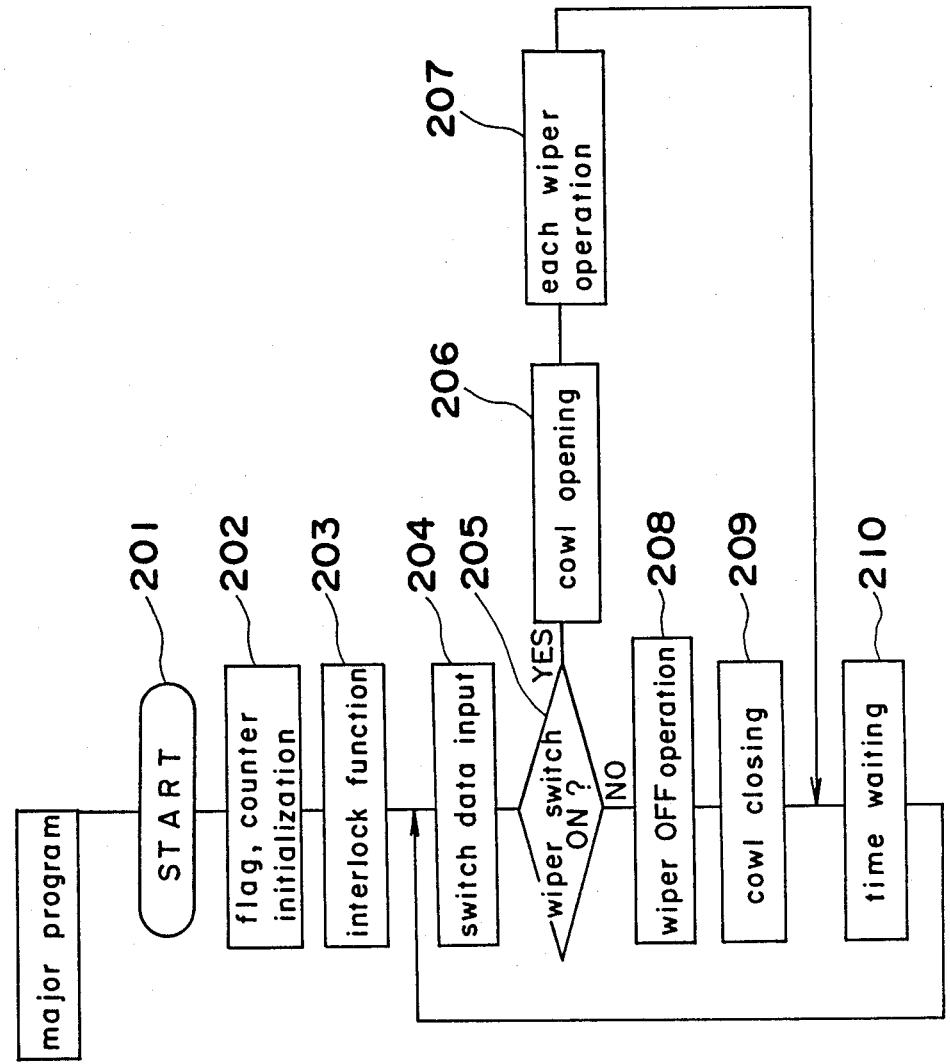
FIG. 10 is a flow chart showing the major program.

FIG. 10 is a flow chart showing the main program of the MPU 41, wherein the program moves from step 201 of the start to the time-waiting step 210 through steps 202, 203, ... as shown. In accordance with the on or off condition of the wiper switch 36 of step 205, the operation of the cowl cover 4 (hereinafter referred to as cowl operation) and the wiper operation are operatively operated from step 206 to step 207 or from step 208 to step 209.

Figure 11:
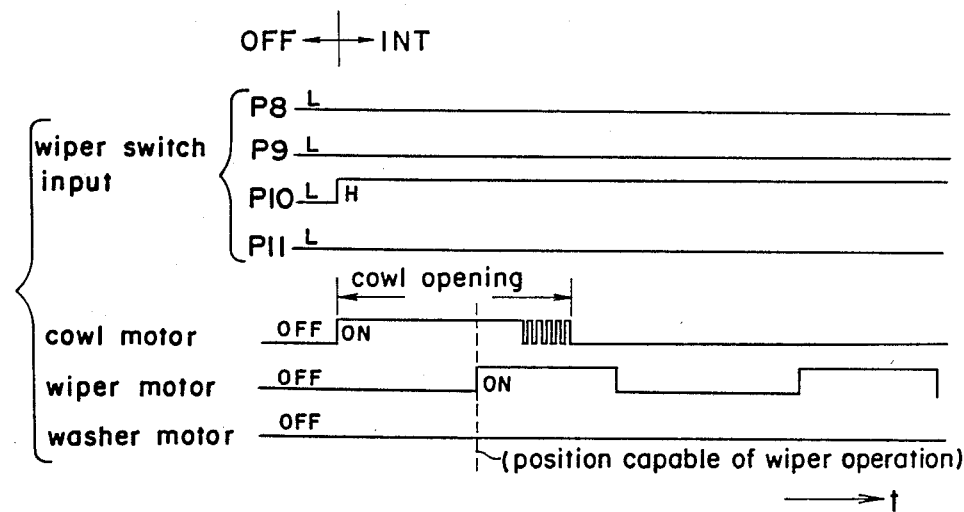
FIG. 11 shows the operations of the INT switches within the wiper switches, with FIG. 11(A) being a diagram showing the input condition into the MPU corresponding to the positions of the INT switches, and showing the operation, FIG. 11(B) being a diagram showing the ON - OFF condition of each motor.

The wiper switch 36 is adapted to operate the cowl driving motor 5, the wiper motor 38 and the washer motor in accordance with each of the wiper switch positions. For example, when the INT of the wiper switch 36 is turned on, a pulse enters the input port P10 of the MPU 41 as shown in FIG. 11(A) to turn on the cowl driving motor 5 as shown in FIG. 11(B) so as to open the cowl cover 4 in accordance with step 206 of the main program, more particularly, the cowl opening program shown in FIG. 14. When the cowl position detector 30 detects the wiper operation possible position, the program advances to step 207 to operate the wiper motor 38 and, thereafter, the wiper 3 is caused to intermittently operate with the cowl cover 4 being open.

Figure 12:
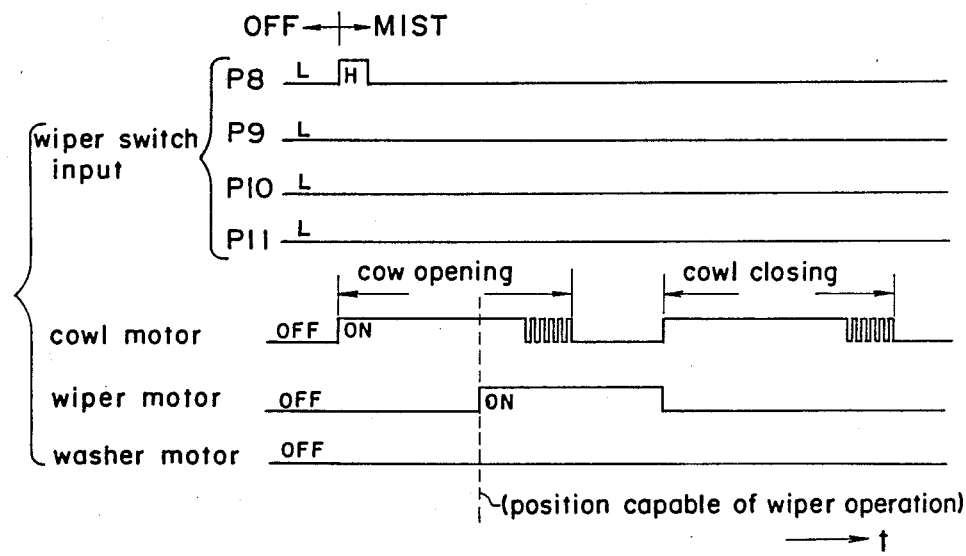
FIG. 12 shows the operations by the MIST switches within the wiper switches, with FIG. 12(A) being a diagram showing the input condition into the MPU and FIG. 12(B) being a diagram showing the ON - OFF condition of each motor.

When the MIST switch (mist switch) of the wiper switch 36 is turned on, a constant short time of pulse enters the port P8 of the MPU 41 as described in FIG. 12(A) to run on the cowl driving motor 5 as shown in FIG. 12(B) to open the cowl cover 4. When the wiper operation possible portion is detected, the wiper motor 38 is operated to effect its wiping operation by one time so as to close the cowl cover 4 after the wiper 3 has been stopped and accommodated.

Figure 13:
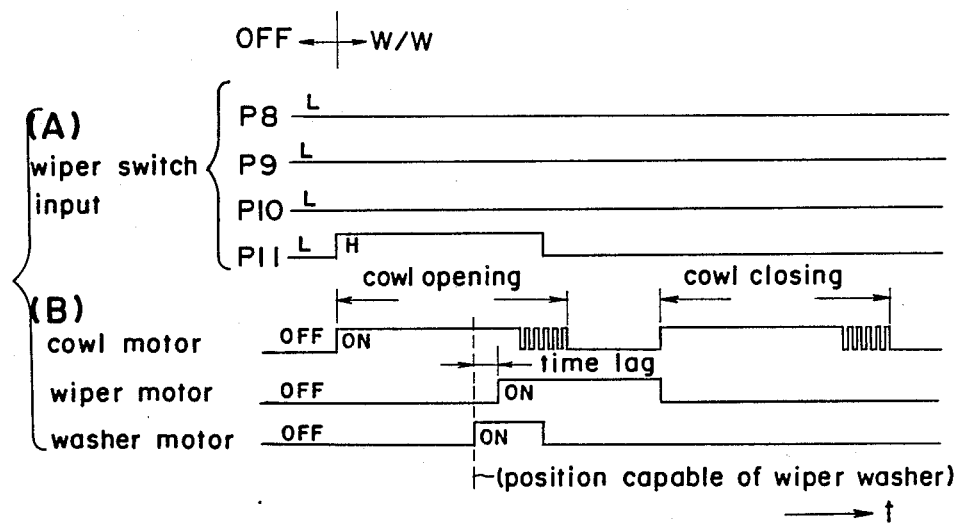
FIG. 13 shows the operations by the washer switches within the wiper switches, with FIG. 13(A) being a diagram showing the input condition into the MPU and FIG. 13(B) being a diagram showing the ON - OFF condition of each motor.

When the W/W switch (washer switch) of the wiper switch 36 is turned on, the pulse enters the port P11 of the MPU as shown in FIG. 13(B). When it is detected that the cowl cover 4 has arrived at the wiper operation possible position, the washer motor is operated to operate the wiper motor 38 about 0.5 second after the operation of the washer motor. After the wiping operation has been operated about three times, the wiper motor 38 stops to close the cowl cover 4. The LO or HI operation of the wiper motor is also the same in the opening operation of the cowl as in the INT operation, with the rotating speed or the like being different.

The cowl opening operation at step 206 of the main program, i.e., the operative cooperation between the wiper and the operation of the cowl cover 4 from the closing position shown in FIG. 2 to the opening position show in FIG. 3 will be described in accordance with the flow chart shown in FIG. 14.

When the on condition in the wiper pass switch 36 at the main step 205 is inputted to the MPU 41, the program moves to step 301 of the cowl opening step 206. At step 301, the data of the input ports P4, P5, P6 are received. At the next step 302, it is checked whether or not the position is the cowl open position (L, L, H). When the position is the cowl open position, the program moves to step 303. At step 303, the (H, H, H) level is outputted to the output ports P1, P2, P3 to turn off the transistors for relay driving use 63, 64 and electrostatic transistor for voltage controlling use 80, 81 to stop the cowl opening operation. Then, as the cowl cover 4 has been detected to be at the fully open position at step 304, a wiper operation approval flag is set to memorize in a condition where the wiper operation is performed. At step 305, a lock flag for judging whether or not the cowl driving motor is at the locking condition and a timer flag for judging whether or not the cowl operation timer is in its set condition are respectively set to return to step 207 of the main program. At step 207, the wiper operation is effected if the wiper operation approval flag is set. The program advances to the time waiting of step 210 as it is if the wiper operation approval flag is not set. At step 210, the time waiting operation of about 5 ms is effected.

When the position is not the cowl open position at step 302, the program advances to step 310 to judge whether or not the lock flag is set. As it is reset at step 202 of the main program at the first time, the program advances to step 311. As the timer flag is reset, as in step 310, even at step 311, the program advances to step 312 to set the motor operation timer and the timer flag. The motor operation timer limits the cowl operation time in terms of time to have a circuit breaking function, combining with the later described step 322 and its subsequent processing.

At step 313, it is checked whether or not the position is the wiper operation possible position. When the position is the wiper operation possible position, the program moves to step 314 to set the wiper operation approval flag to advance to step 315. The (L, H, L) level is outputted to the output ports P1, P2, P3 to excite the relay for driving the cowl opening 61 and to turn on the electrostatic transistors for voltage controlling use 80, 81 so as to rotate the motor for cowl driving use 5 in the opening direction for advancing to the next step 319. When the position is not the wiper operation possible position at step 31, the program advances to step 316 to judge whether or not the position is a cowl opening chopping position. When the judgement is negative, the program advances to step 315 to effect the similar operation. Also, in the case of the opening chopping position, the on-off signal is outputted by about 100 Hz to the output port P3. The electrostatic transistors 80, 81 for voltage controlling use repeat the on-off so that the average voltage applied upon the motor 5 for cowl driving use becomes one half of the whole voltage in about 50% by duty ratio and the rotating speed of the motor for cowl driving use becomes one-half. If the duty ratio of the chopping is varied, the average voltage to be applied upon the motor 5 for cowl driving use is varied. As the rotating speed is lowered and the step precision of the cowl cover 4 may be improved, the stopping circuit 50 is provided.

At step 318, the wiper operation approval flag is set to move to step 319. At step 319, one is subtracted from the counter value of the motor operation timer to check at the next step 320 whether or not the count value of the motor operation timer is 0. When the count value is not 0, the program moves to step 207 of the main program. Thereafter, before the cowl opening position is detected or the motor operation timer becomes 0, each of the processings is effected by each cowl position. Also, the cowl operation time becomes the time-waiting product of the count value of the cowl operation time and of step 210 of the main program, thus becoming about 5 s. When the motor operation timer becomes 0, the program moves to step 322 to turn off the relay 61 for driving a 50 ms cowl opening operation to stop the coil operation. When the motor for driving the cowl 5 is reversed without stop time, about double the voltage is applied upon the contact point of the relay 61, it is provided to prevent the relay contact-point from being deposited. At the next step 323, a lock flag for judging the lock condition is set and the motor reversing timer is set. When the lock flag is set, the program advances from step 310 to step 324 from the next time, so that the cowl opening operation is not effected. At step 324, it is judged whether or not the wiper operation approval flag is set. If the wiper operation approval flag is kept set, the program moves to step 325 to judge whether or not the position is capable of the wiper operation. When it is impossible to operate the wiper, at steps 326, 327, 328 and 329, and before the motor reversing timer becomes 0, the (H, L, L) level are outputted to the output ports P1, P2, P3 to effect the cowl reversing operation, i.e., the closing operation of the cowl cover 4. Namely, the cowl reversing operation is effected only till the position capable of the wiper operation as the wiper is possible to operate with the wiper operation approval flag being set. Thereafter, till the position capable of the wiper operation is detected or the motor reversing timer becomes 0, the above-described operation continues. The cowl reversing time becomes the product of the time waiting with respect to step 310 as in the cowl operation time, and is set to about 5 s. When the position capable of the wiper operation has been detected or the motor reversing timer has been 0, the program advances to step 340 to output the (H, H, H) level to the output ports P1, P2, P3 so as to stop the cowl operation. Then, the program moves to step 341 to continuously stop the cowl operation till a wiper switch 36 and a cowl switch 40 change. This is done to prevent the cowl from being operated again through time controlling operation. If the switch changes, the program advances to the switch 342 to reset the lock flag and the timer flag so as to move to step 207 of the main program for effecting the cowl operation again in accordance with the switch condition. Also, when the wiper operation approval flag is reset at step 324, the program moves to step 330, and the cowl closing operation or the cowl chopping operation is performed in accordance with each cowl position at step 330 and its subsequent till the cowl closing position is detected or the motor reversing timer becomes 0.

Figure 14B:
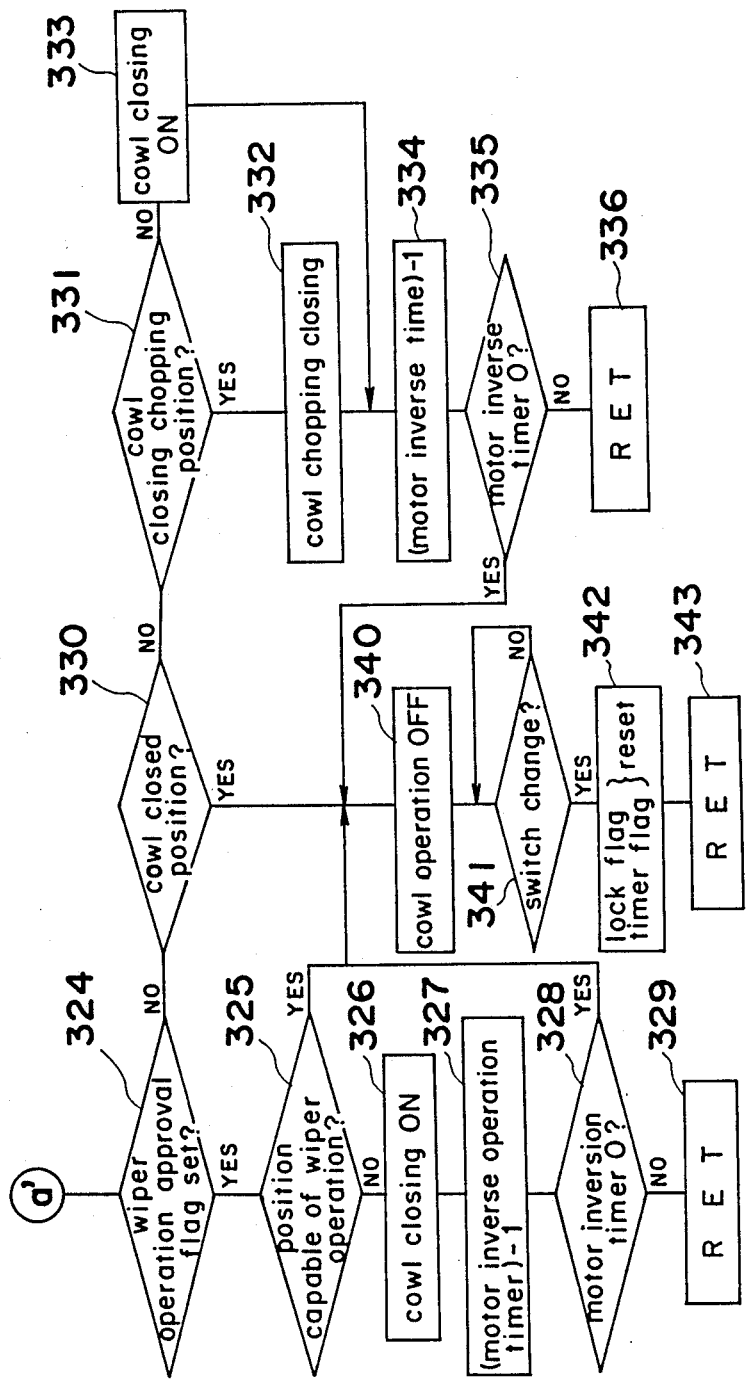
FIG. 14 is a flow chart showing the opening program of the cowl cover.
Figure 15A:
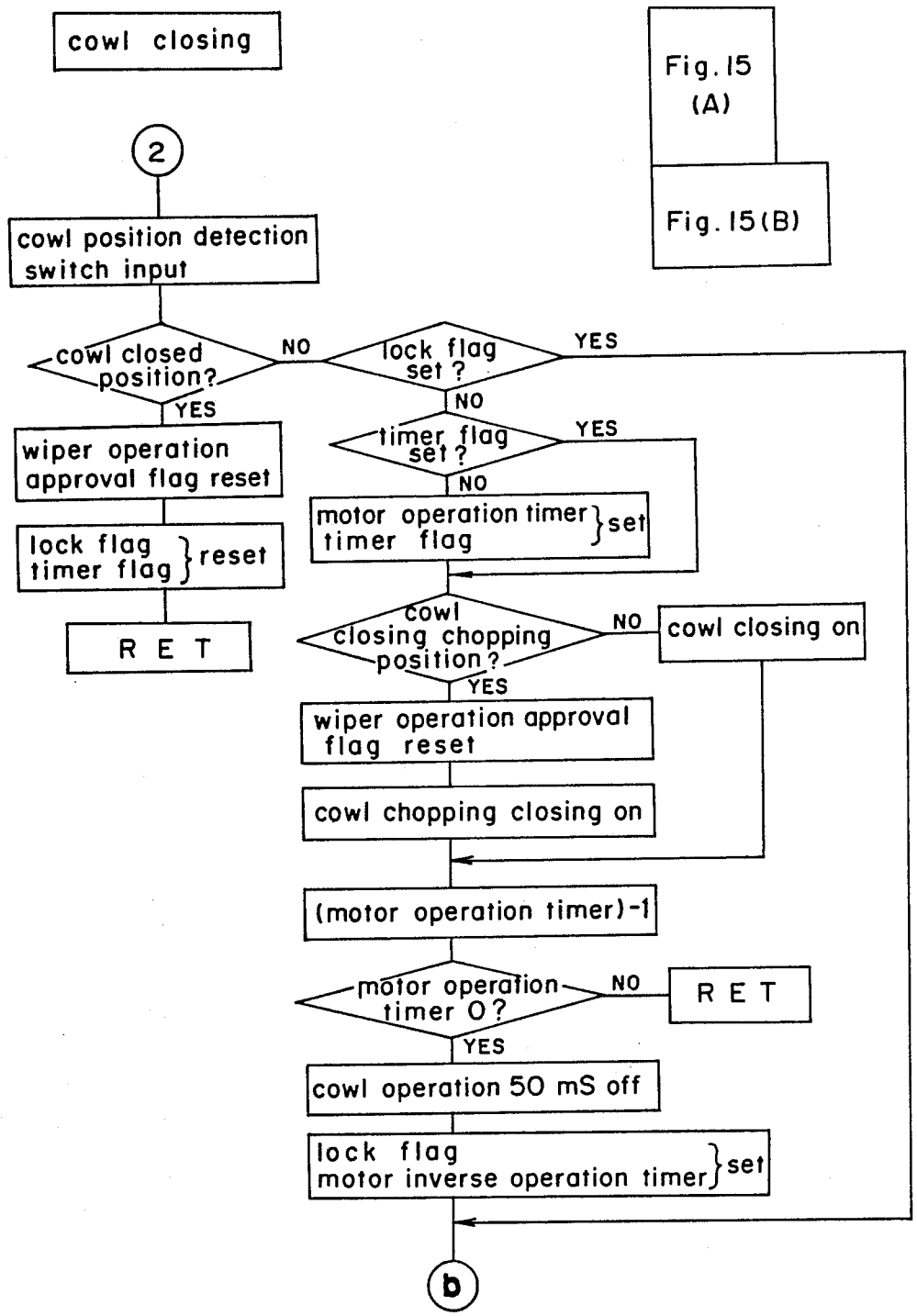
FIG. 15 is a flow chart showing the closing program of the cowl cover.
Figure 15:
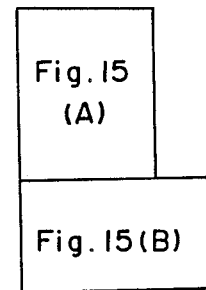
Figure 15B:
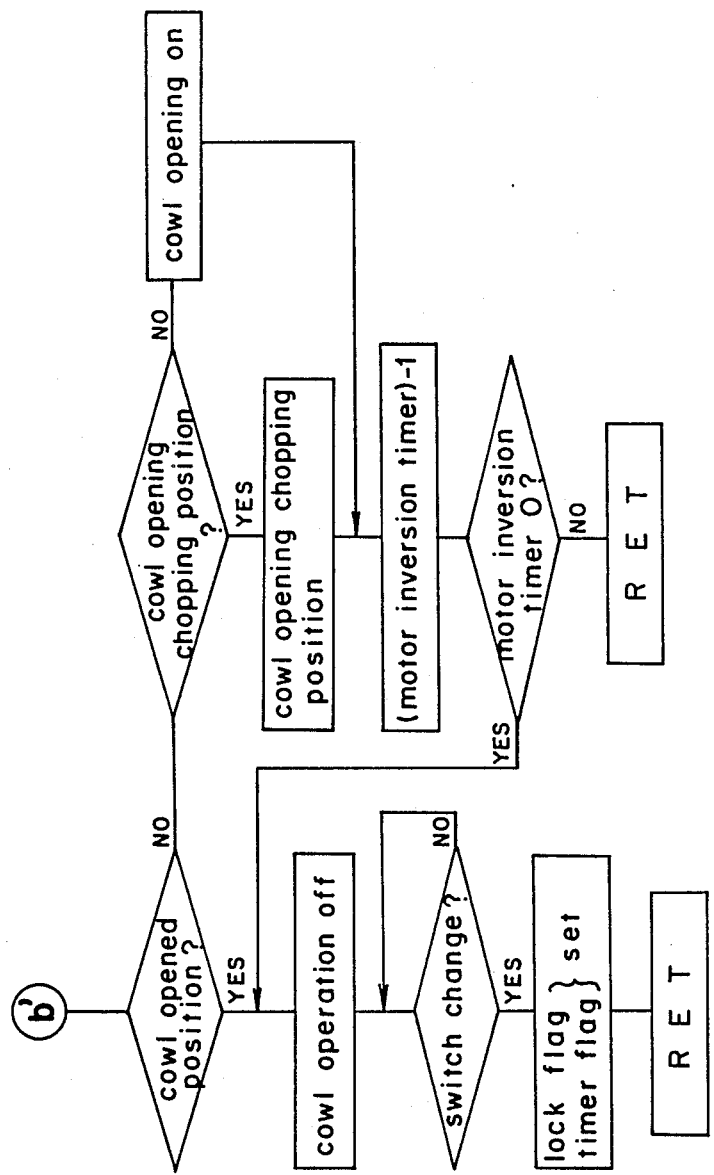

As the closing operation of the cowl cover 4 is shown in the flow chart of FIG. 15 and is almost the same as the flow chart of the opening operation shown in FIG. 14, the description is omitted.

Figure 16:
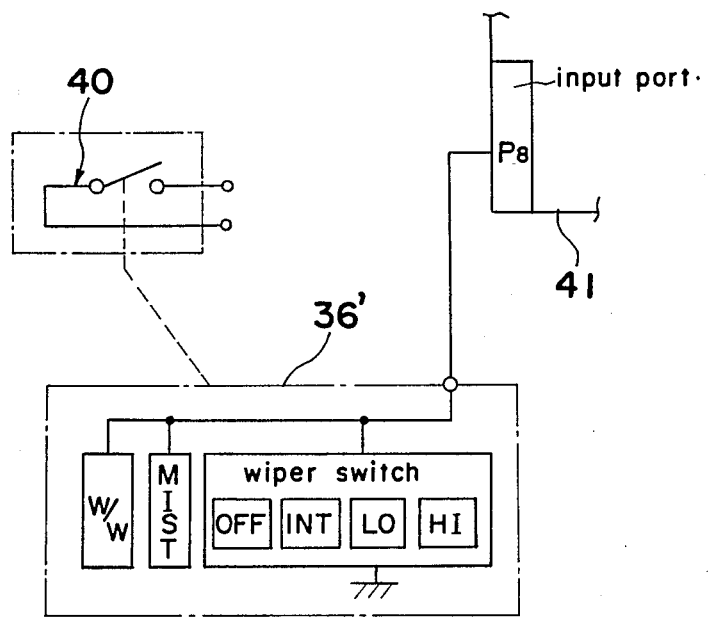
FIG. 16 is a circuit diagram showing a modified embodiment of a wiper switch.

The present invention is restricted to the embodiment. In the wiper switch 36, the MIST switch and the W/W switch may be separate from the wiper switch 36' as shown in FIG. 16.

Figure 17:
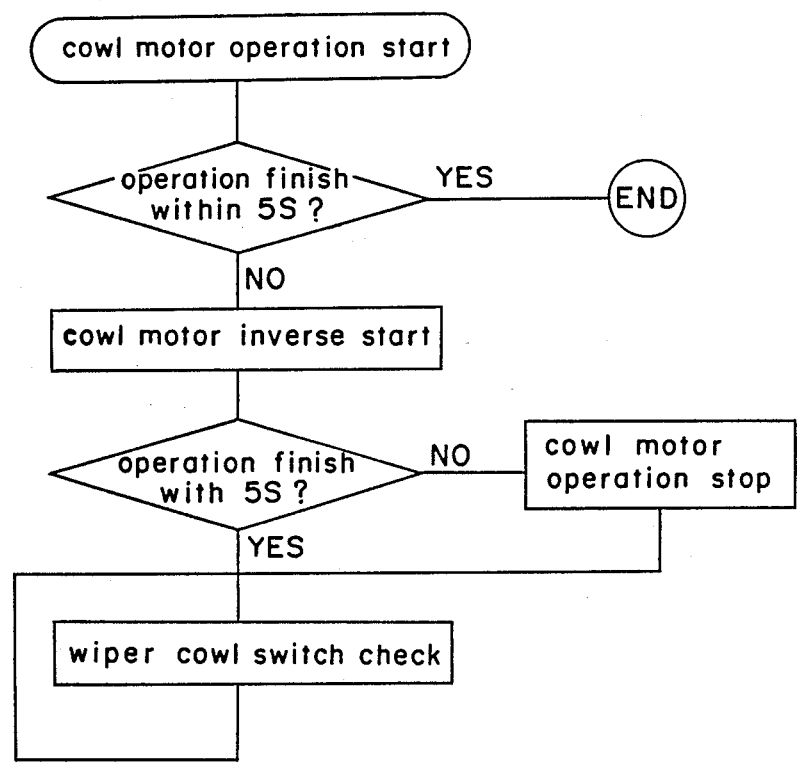
FIG. 17 is a flow chart of the program superior even in terms of safety measures.

Also, such a program as shown in FIG. 17 is inputted to the MPU 41 for safety measures. Namely, when the position of the operation completion is not detected within five seconds after the operation of the cowl driving motor 5, the cowl driving motor 5 is reversed. After the reverse operating completion or the cowl driving motor 5 has been stopped with the reverse operation being impossible to be effected, the wiper 3 and the cowl cover 4 are not operated unless the wiper switch 36 or the cowl switch 40 is not operated again. As it is possible for the wiper 3 to be operated when the wiper operation approval position is detected in the closing operation of the cowl cover 4, the reversing operation is effected only as far as the position capable of the wiper operation.

As is clear from the foregoing description, according to the arrangement of the present invention, the opening and closing operations of the cowl cover are operatively cooperative with the operation of the wiper to operate the wiper when the cowl cover reaches the position where it does not interfere with the wiper. As the cowl cover may operate the wiper before it reaches the fully open position, the quick operation of the wiper may be provided as compared with the conventional one. When the mud adhering to the front glass through the mud splashes suddenly deteriorates the range of vision, the mud may be quickly removed by the wiper to improve the safety.

Also, when it is detected that the cowl cover reaches a position (chopping position) before it enters the stop position during the opening and closing operations of the cowl cover with the chopping circuit being provided in the controlling circuit in accordance with the present invention, the input into the cowl driving motor is chopped to make the cowl cover slower in speed, so that the stop accuracy may be improved.

In the present controlling circuit, a cowl switch which operatively cooperates with a wiper switch is provided, the opening and closing of the cowl cover only or the operative cooperation of opening and closing of the cowl cover with the wiper may be selected by the on or off operation of the cowl switch. The upkeep, inspection, cleaning, etc. of the wiper may be performed by the opening and closing operations of the cowl cover only.

Also, according to the window wiper accommodating apparatus in accordance with the present invention, the cowl cover may be smoothly moved under the bonnet, with the inclination of the bonnet extension being retained as the cowl cover is moved at one step through the nonlinear movement, to make the opening and closing speed faster. Also, as the direction is not required to be changed even in the driving mechanism, it may be simplified. Also, in the driving mechanism, the rotating operation is converted into the nonlinear movement by the use of four-section link system, the cowl cover is nonlinearly moved by the use of the link, thus resulting in higher reliability, and the cowl cover may be positively moved nonlinearly by a guide which is the same in shape as the track of the nonlinear movement.

The opening and closing operation of the cowl cover operatively cooperates with the operation of the wiper to actuate the wiper when it reaches the position where it does not interfere with the wiper so as to operate the wiper before the cowl cover reaches the fully open position, so that the faster operation of the wiper may be retained as compared with the conventional one. When the mud adhering to the front glass through the mud splashes suddenly deteriorates the range of vision, the mud may be quickly wiped by the wiper to improve the safety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A controlling circuit for a concealed window wiper accommodating apparatus wherein a cowl is provided movably to open or close an opening portion formed between the lower edge of a front window glass and the rear end portion of a bonnet, and a wiper including a wiping portion to be lifted for wiping the front window glass through the opening portion is accommodated within the bonnet, comprising a cowl motor for operating the cowl cover to move from the closed position to the opened position, a wiper motor for operating the wiper so as to lift the wiper portion onto the front window glass, a first means for driving the cowl motor to be turned on by a drive controlling operation, and a second means for generating a position signal to actuate the wiper motor upon detecting that the cowl cover moving to open has reached a position where the wiping portion is capable of lifting without causing an interference with the cowl cover, a switch which is opened and closed in accordance with the position of an output shaft of a gear portion being provided, the gear portion being disposed along a transmission route extending between the cowl driving motor and the cowl cover, as a detector for inputting into the controlling circuit the position signal during the opening and closing operation of the cowl cover so that before the cowl cover reaches the opened position, the wiper is set to be operated.

2. A controlling circuit for a window wiper accommodating apparatus in accordance with claim 1, wherein the position signal which has detected a position before the fully opened position or the fully closed position is reached is inputted during the opening and closing operations of the cowl cover, the moving speed of the cowl cover is set to be switched to a low speed from a high speed before the stop position, with a chopping circuit for dropping the voltage to be applied upon the cowl driving motor being provided.

3. A controlling circuit for a window wiper accommodating apparatus in accordance with claim 1, wherein a cowl switch is provided which selects only the opening and closing operations of the cowl cover and the operative cooperation between the cowl cover and the wiper.

4. A controlling circuit for a window wiper accommodating apparatus in accordance with claim 1, wherein the cowl driving motor is adapted to be reversed when the cowl operating position is not detected within a given time in the controlling circuit.

5. A concealed window wiper accommodating apparatus comprising a cowl cover provided movably to open or close an opening portion which is formed between the lower edge of a front window glass and the rear end portion of a bonnet, a wiper including a wiping portion to be lifted for wiping the front window glass through the opening portion and accommodated within the bonnet, a cowl motor for operating the cowl cover to move from the closed position to the opened position, a wiper motor for operating the wiper so as to lift the wiper portion onto the front window glass, a pair of gear means provided on both the sides of the opening portion to be rotatably driven in the synchronous relation with each other by the cowl motor provided within the bonnet, a four-section link means including an input section secured to the output shaft of each of gear means and an output section of performing a non-linear movement coupled to the cowl cover so that the cowl cover is adapted to move nonlinearly under the bonnet while retaining the inclination of the bonnet extension, a cowl position detector provided on at least one of the gear means with a contact point to be opened and closed in accordance with the position of the output shaft of the gear means so that the cowl position detector is adapted to actuate the wiper motor when it detects that it has reached the position capable of lifting the wiper portion without causing an interference with the cowl cover before reaching the opened position of the cowl cover during the opening movement of the cowl cover.

6. A window wiper accommodating apparatus in accordance with claim 5, wherein a guide member which has a long groove corresponding to a nonlinear shape of a movement track of the cowl cover is provided by one at least within the opening portion, a roller which is engaged for its free slidable rotation within the long groove is provided on the cowl cover, the cowl cover is guided through the long groove so that it is adapted to be nonlinearly moved under the bonnet.

7. A window wiper accommodating apparatus in accordance with claim 5, wherein the portion between the cowl cover and the output section is adapted to be pulled by an elastic member so that the couple of forces may be applied upon the cowl cover with respect to the output section of the four-section link system.

8. A window wiper accommodating apparatus in accordance with claim 5, wherein a stopper which comes into contact with the engagement portion on the side of the cowl cover during the closing of the cowl cover is provided on the output section of the four-section link system to retain the inclination of the cowl cover during the closing.

9. A window wiper accommodating apparatus in accordance with claim 5, wherein the cowl driving motor is disposed at the central portion of the vehicle body, the torque wire cables being connected respectively to both ends of the output portion of the cowl driving motor, the rotary torque is adapted to be transmitted in synchronous relation to gear portions disposed on both right and left sides of the bonnet through the torque wire cables.

* * * * *

UNITED STATES PATENT AND TRADEMARK OFFICE
CERTIFICATE OF CORRECTION

PATENT NO. : 4,852,205
DATED : August 1, 1989
INVENTOR(S) : Takahiko TANAKA et al It is certified that error appears in the above-identified patent and that said Letters Patent is hereby corrected as shown below: On the title page:

In Section [73], Assignee, kindly add

--ASMO Co., Ltd., 390, Umeda, Kosai-shi, Shizuoka-ken,

Japan--.

Signed and Sealed this

Fourteenth Day of August, 1990

Attest:

HARRY F. MANBECK, JR.

*Attesting Officer*     *Commissioner of Patents and Trademarks*